United States Patent Office 2,788,310
Patented Apr. 9, 1957

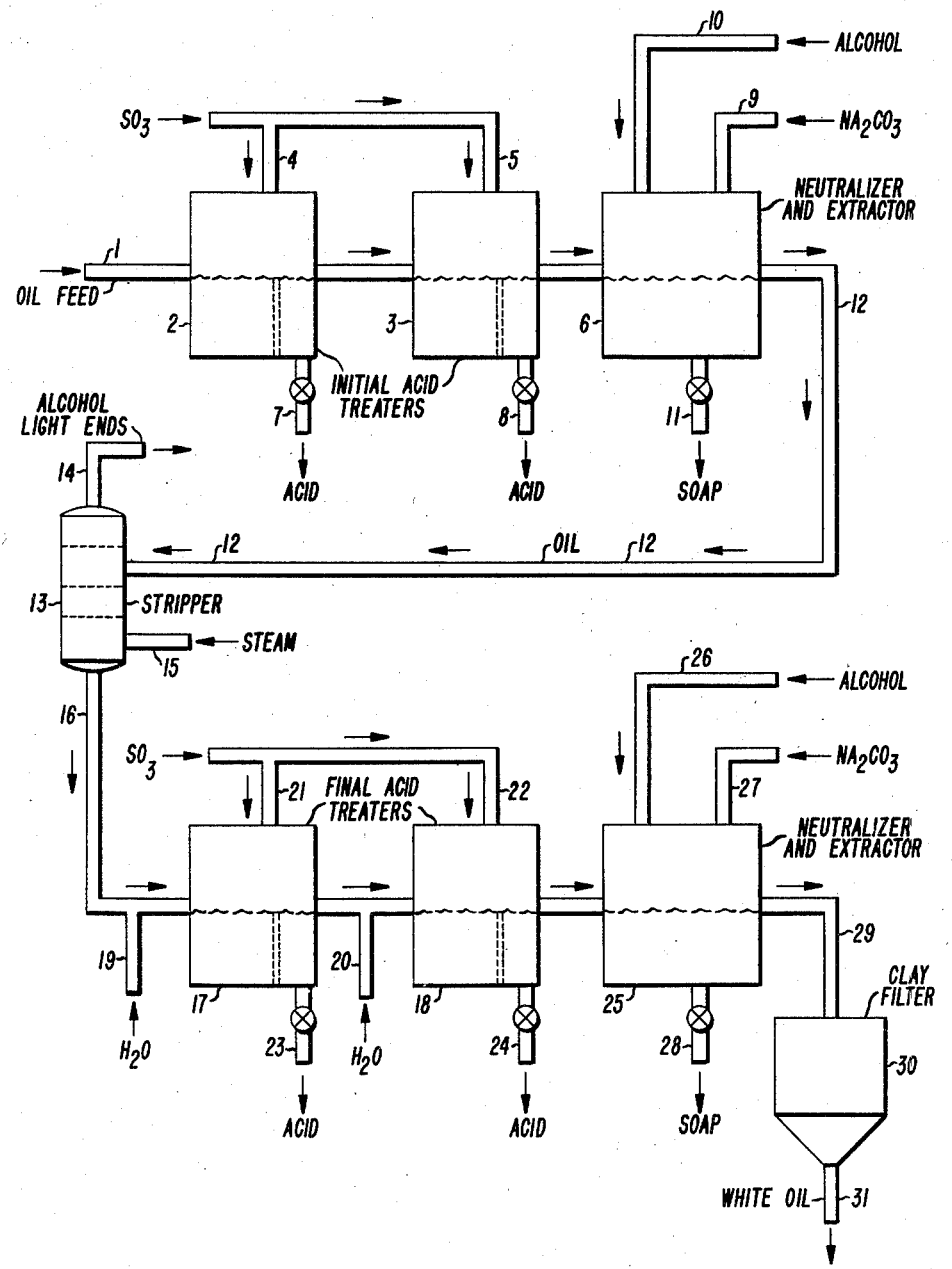

2,788,310

WHITE OIL PROCESS

William A. Wilson, Roselle, and Thomas O. Wehrle, Fanwood, N. J., assignors to Esso Research and Engineering Company, a corporation of Delaware Application April 7, 1955, Serial No. 499,866

3 Claims. (Cl. 196—40)

This invention relates to the process of manufacturing highly refined white mineral oils wherein mineral oil or petroleum distillates are treated with fuming sulfuric acid or sulfur trioxide to form and remove sulfonatable components, then are given final purification treatments to obtain a white oil which meets high requirements of being colorless, tasteless, and stable toward chemical reagents.

In the preliminary acid treating steps oleum or $SO_3$ is used in successive stages or dumps. The treatment with oleum or sulfur trioxide converts unstable components to sulfonic acids which are separated in the lower weak acid layer and to mahogany acids which tend to remain dissolved in the oil. A point is reached in the treatment at which fuming sulfuric acid or $SO_3$ begins to react with various components of the oil which leads to lowering in the yield of the final treated oil product.

The present invention overcomes the disadvantages hitherto experienced in using oleum or sulfur trioxide to the extent required for obtaining a high quality product. According to the present invention, in the last stage or stages of treating the oil a relatively small quantity of water is added to the oil which is treated with sulfur trioxide, the quantity of water added being such as to maintain a treating agent containing preferably close to 70 wt. percent sulfur trioxide.

In the initial treating steps any conventional process for manufacturing white mineral oil may be employed, e. g. treatments with 20 to 30% oleum in a proportion ranging from 20 to 50 volume percent with respect to the oil. An alternate process uses sulfur trioxide in liquid or gaseous phase. Attempts made to use sulfur trioxide in the final treating steps were found to result in a scorching of the oil, thereby rendering the oil unfit for meeting white oil requirements, e. g. such as U. S. Pharmacopoeia (U. S. P.).

By the improvement of the present process sulfur trioxide is used as the treating agent provided proper small amounts of water are added to the oil. In admixing the sulfur trioxide and the water with the oil undergoing final purification, agitation in a tub-type agitator or similar means for obtaining homogeneous mixing may be used.

For the purpose of illustration, a flow plan of a white oil manufacturing process which uses the present invention is shown in the drawing.

Referring to the drawing, the petroleum oil distillate suitable for white oil manufacture is sent as a feed by line 1 through a series of initial acid treating units 2 and 3.

Lubricating oil fractions from coastal petroleum crude oils boiling in the range of 600° F. to 1000° F. are suitable feeds. These fractions may be solvent extracted and clay treated stocks.

The acid treating units may be equipped with mechanical agitating means for obtaining good mixing of the oil with oleum or sulfur trioxide fed to these units through lines 4 and 5. Also with these units may be employed gravity settlers or centrifuges for separating mahogany acids or water-extractable sulfonic acids from the oil. These acids are removed through drains 7 and 8. The initially acid-treated oil may then be subjected to neutralization with caustic or sodium carbonate from line 9 for extraction with alcohol from line 10 in vessel 6 to remove soaps formed from oil-soluble sulfonic acids. The alcohol-soap extracts are withdrawn through line 11.

The neutral (upper layer) oil is passed by line 12 to stripper 13 for stripping out light ends including alcohols. Such light ends are removed by overhead line 14. Steam for heating is supplied by line 15.

The neutral oil is passed by line 16 to final acid purification treating units 17 and 18 to which water is fed from inlets 19 and 20 and the sulfur trioxide is fed to these treaters from inlets 21 and 22. Acid sludge is drained by lines 23 and 24. The acid treated oil may then be given an additional neutralization and extraction in unit 25 by alcohol from line 26 and sodium bicarbonate from line 27. Soap extract may be separated from the oil through line 28. The neutralized oil is then passed by line 29 into a clay filter 30 to obtain a finished product withdrawn by line 31.

The following example demonstrates the methods of reducing invention to practice.

EXAMPLE

White oil distillates are oleum or $SO_3$ treated in each initial treat each followed by a sludge settling period prior to intermediate neutralization removal of mahogany soaps. A total of 8 to 14 volume percent of oleum (20% free $SO_3$ in oleum) is normally used prior to the intermediate neutralization in the plan. If sulfur trioxide is used, a total of 4 to 8 volume percent is used (expressed as equivalent 104.5% $H_2SO_4$).

After completion of the two initial acid treats described, the acid oil containing the mahogany acids is separated from the acid sludge and is contacted with 0.4 to 0.6 volume of 60 volume percent isopropyl alcohol per volume of original oil charged. Sufficient 15 wt. percent concentration sodium carbonate solution is also added to make the entire acid oil and alcohol mixture alkaline. Approximately 0.3 to 0.20 gallon of carbonate solution is added per gallon of original oil charge. The resultant sodium sulfonate-oil-alcohol emulsion flows to a settler which is maintained at 110 to 125° F. The alcohol-sodium mahogany sulfonate solution settles out as a lower layer and is drawn off for further processing. The upper neutral oil layer, now free of mahogany soap, is steam stripped to remove traces of alcohol and light ends prior to the final acid treating stages.

The final acid treatments, which follow the intermediate neutralization, are preferably made in two or three separate stages at about 105° F. and with 3.3 volume percent $SO_3$ (expressed as volume percent of equivalent 104.5% sulfuric acid based on the volume of oil charged to the first acid treater). The amount of $SO_3$ applied on each of the final treats is equivalent to about 5.4 grams of pure $SO_3$ for 100 cc. of feed oil charged to the first acid treater before the intermediate neutralization. Sufficient water is added to the oil to be treated to produce 70 wt. percent free $SO_3$ in the oleum formed from the combination of $SO_3$ and water. The amount of water added to each treat is equivalent to about 0.033 gram of water per 100 cc. of oil charged to the first acid treater.

The acid oil from the final acid treater is settled to remove acid sludge, then is fed to a neutralizing agitator. In the neutralization of the finally acid treated oil, the oil is contacted with 8 to 10 volume of 60 volume per ment isopropyl alcohol per volume of original oil fed to the plant. Approximately 0.04 gallon of 15 wt. percent sodium carbonate solution is added per gallon of original oil fed to the plant. The final neutralization settling step is carried out at 125° F.

The total yield of mahogany soap ranges from 5.2 to 7.6 volume percent based on the original oil charged. Mahogany soap yields after the intermediate wash range from 0.1 to 0.5 volume percent based on the oil charged to the first acid treater before the intermediate wash. The final neutralized oil is filtered. Plant oil filters are periodically charged with fresh clay. The oil is percolated through the filter until the oil leaving the filter no longer passes specification acid test, odor test and color test. The filter yield is expressed as the number of thousand gallons of oil obtainable with a 7 ton clay charge to the filter before the oil leaving the filter goes off specification. Thus, a larger clay filter yield is indicative of better acid purification.

The U. S. P. A. T. pharmacopoeia acid test, abbreviated U. S. P. A. T., evaluates the purity or degree of refinement of the white oils. For this test, a mixture of the oil and concentrated sulfuric acid is heated with agitation and the intensity of the color developed in the acid layer is determined. A dark color indicates a lower degree of oil refinement than a lighter color. The colors are measured on a spectrophotometer. The U. S. P. acid test value is obtained by multiplying the optical density reading (obtained on the spectrophotometer) by 11. A U. S. P. acid test result of 3 maximum is specified for high grade white oils.

A relative quantity of $SO_3$ and water present when using the conventional oleum finishing treatment as compared to the finishing treatment of the present invention which adds free $SO_3$ and water is given in the following Table I.

*Table I*

| Final Acid Treat | Wt. Percent Eq. $H_2SO_4$ | Wt. Percent Free $SO_3$ | Total $SO_3$ Wt. Percent (Free and Combined) | Wt. Percent Combined Water |
|---|---|---|---|---|
| Oleum | 104.5 | 20 | 85.30 | 14.7 |
| $SO_3$ and Water recommended herewith | 115.75 | 70 | 94.49 | 5.5 |

It is to be noted that the method of the present invention uses a considerably larger amount of $SO_3$ in terms of free $SO_3$ and much less water in terms of combined water than the oleum treatment. In the final acid treatment of the present invention the permissible treatment is made with 8 to 15 wt. percent of 60 to 80 wt. percent free $SO_3$ while the preferred amount of free $SO_3$ is of the order of 70 wt. percent or in the preferred range of 10 to 11 wt. percent of 69 to 71 wt. percent free $SO_3$.

To demonstrate the advantages of the present invention comparable tests were conducted using in the final stages of treatment sulfur trioxide alone, and sulfur trioxide with water added to the oil being treated to maintain an effective treating agent having 70 wt. percent free sulfur trioxide.

The data presented in the following Table II show that for the same degree of treating the addition of water during the treatment with sulfur trioxide imparted better quality values to the final neutral oil, particularly in color and degree of refinement (U. S. P. acid test) with outstanding improvement in filter yield. The filter yield test is a determination of volume of percolated oil obtained per volume of clay which gave the desired inspection tests.

*Table II*

COMPARATIVE FINISHING TREATMENTS WITH GASEOUS $SO_3$ EFFECT OF WATER ADDITION TO OIL.

| Experiment No | 265-48 | 299-127 | 265-74 | 299-151 |
|---|---|---|---|---|
| Water Addition to Oil Feed | No | [1] Yes | No | [1] Yes |
| No. of Treating Stages | 3 | 3 | 2 | 2 |
| Total $SO_3$ Treat [2] (after intermediate wash) | 9.8 | 10.0 | 9.5 | 10.8 |
| Treating Temperature, ° F | 105 | 105 | 105 | 105 |
| Treated Oil Inspections Prior to Clay Percolation: | | | | |
| Color, Saybolt | +14 | +29 | +14 | +17 |
| U. S. P. Acid Test | 10+ | 4.7 | 10+ | 8.8 |
| Equivalent Plant Clay Filter Yield, M Gal.[3] | 27.5 | 127.0 | 20.2 | 88.0 |

[1] Water added at last treating stage to make treating agent 70 wt. percent free $SO_3$.
[2] Expressed as vol. percent of 104.5% $H_2SO_4$.
[3] Filtration discontinued when U. S. P. A. T. of percolated oil was 2.8.

The results tabulated in Table II clearly show both final neutral oil quality and filter yield advantages for the treatments using sulfur trioxide with added water.

The admixing of the water with the sulfur trioxide gives far better results than can be obtained by using oleum. In using oleum, e. g. 20% oleum in three treating stages, approximately 80% more acid had to be used to obtain a finished white oil which at the same time was of lower quality than obtained in using the sulfur trioxide with added water. The oleum treatment also gave a much lower filter yield amounting to 85 M gallons compared to 127 M gallons with the process of the present invention.

The invention described is claimed as follows:

1. In a process of preparing a white oil wherein a mineral oil is initially treated to form, neutralize, and remove sulfonic acids, the improvement in final purification of the neutralized oil from which sulfonic acids have been removed, of first admixing with said oil a relatively small amount of water and then treating the resulting oil-water mixture with an amount of sulfur trioxide which, if mixed with the small amount of water alone, would form an acid having a treating strength of 60 to 80 wt. percent of free $SO_3$.

2. In a process of preparing a white oil wherein a petroleum lubricating oil distillate fraction is initially treated to form sulfonic acids and said sulfonic acids are neutralized then extracted with alcohol, the improvement in a final purification of the neutralized oil from which the sulfonic acids have been removed which comprises admixing said neutralized oil in each of a plurality of stages first with a relatively small amount of water, and then treating the resulting oil-water mixture with an amount of sulfur trioxide, the amount of water and free $SO_3$ added being in a proportion which if mixed alone would form an acid having a treating strength of 60 to 80 wt. percent of free $SO_3$.

3. In a process of manufacturing a high quality white mineral oil from a petroleum lubricating oil distillate fraction, wherein said distillate fraction oil is treated with sulfur trioxide to form sulfonic acids which are then neutralized and extracted with isopropyl alcohol, the improvement in final purification of the neutralized oil from which the sulfonic acids have been removed, comprising stripping the oil free of low boiling compounds including traces of the alcohol, mixing with the stripped oil a relatively small amount of water, passing the resulting oil-water mixture into a treating zone into which $SO_3$ is added, the water and free sulfur trioxide being added in a proportion which, if mixed alone, would form an acid containing about 70 wt. percent free $SO_3$, repeating the treatment of the oil in another separate stage with more addition of water to the oil and $SO_3$ to the resulting oil-water mixture, the amount of water and free $SO_3$ being in the same proportion as in the first stage, settling the thus finally acid treated oil to remove acid sludge, neutralizing the acid oil, extracting neutralized acid from the oil with isopropyl alcohol, then contacting the finally neutralized oil with clay in an amount to give the oil the desired purity including a low acidity.

References Cited in the file of this patent

UNITED STATES PATENTS

| | | |
|---|---|---|
| 1,824,615 | Myers | Sept. 22, 1931 |
| 2,581,064 | Archibald | Jan. 1, 1952 |